US008306988B1

(12) United States Patent
Jyoti et al.

(10) Patent No.: US 8,306,988 B1
(45) Date of Patent: Nov. 6, 2012

(54) SYSTEM, METHOD, AND COMPUTER PROGRAM PRODUCT FOR SEGMENTING A DATABASE BASED, AT LEAST IN PART, ON A PREVALENCE ASSOCIATED WITH KNOWN OBJECTS INCLUDED IN THE DATABASE

(75) Inventors: Nitin Jyoti, Bangalore (IN); Prabhat Kumar Singh, Bangalore (IN); Zhenyu Zhong, Alpharetta, GA (US); Guy William Welch Roberts, Milton Keynes (GB); Jeffrey Martin Green, Sunnyvale, CA (US); Sven Krasser, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 415 days.

(21) Appl. No.: 12/605,678

(22) Filed: Oct. 26, 2009

(51) Int. Cl.
*G06F 7/00* (2006.01)
(52) U.S. Cl. .......... 707/754; 707/711; 709/203; 726/23; 726/22; 726/25; 726/26
(58) Field of Classification Search .................. 707/711, 707/754; 709/203; 726/23, 22, 25, 26
See application file for complete search history.

(56) References Cited

U.S. PATENT DOCUMENTS

2009/0293125 A1* 11/2009 Szor ................................ 726/24
2010/0083376 A1* 4/2010 Pereira et al. .................... 726/22

OTHER PUBLICATIONS

"Enhancing Collaborative Spam Detection with Bloom Filters", Yan et al., Sep. 26, 2006.*

* cited by examiner

*Primary Examiner* — Etienne LeRoux
*Assistant Examiner* — Cindy Nguyen
(74) *Attorney, Agent, or Firm* — Patent Capital Group

(57) ABSTRACT

A system, method, and computer program product are provided for segmenting a database based, at least in part, on a prevalence associated with known objects included in the database. In operation, a database including a plurality of known objects is identified. Additionally, the database is segmented into a plurality of segments. Furthermore, each of the plurality of known objects are assigned to one of the plurality of segments, based at least in part on a prevalence associated with each of the plurality of known objects.

15 Claims, 5 Drawing Sheets

SYSTEM, METHOD, AND COMPUTER PROGRAM PRODUCT FOR SEGMENTING A DATABASE BASED, AT LEAST IN PART, ON A PREVALENCE ASSOCIATED WITH KNOWN OBJECTS INCLUDED IN THE DATABASE

FIELD OF THE INVENTION

The present invention relates to networks, and more particularly to increasing the efficiency of networks with the growing increase of cloud based technologies.

BACKGROUND

In the context of network security, the threat landscape has grown exponentially over the last few years. The threat landscape has grown so much that most Anti-Virus vendors are evaluating and implementing various technologies to mitigate the unmatched growth in the number of threats. As the threat landscape grows, so does the need to mitigate the threats associated with that growth.

Currently, the number of network based lookups required in a network cloud is very high. These network based lookups include performing signature lookups across a network for each file scanned on a system (e.g. a client computer, etc.). Thus, as the number of threats increase, the number of lookups required to ensure the network is secure also increases.

In some cases, however, it may be desirable to keep the lookup rate to less than a certain number of lookups per day. For example, it may be desirable to keep the lookup rate to less than ten lookups per day per client. Thus, harsh criteria is often used to keep the lookup rates low. As a result, many problematic items (e.g. malware, infected files, etc.) are not examined and such items are missed on the client systems. There is thus a need for overcoming these and/or other issues associated with the prior art.

SUMMARY

A system, method, and computer program product are provided for segmenting a database based, at least in part, on a prevalence associated with known objects included in the database. In operation, a database including a plurality of known objects is identified. Additionally, the database is segmented into a plurality of segments. Furthermore, each of the plurality of known objects are assigned to one of the plurality of segments, based at least in part on a prevalence associated with each of the plurality of known objects.

DETAILED DESCRIPTION

Figure 1:
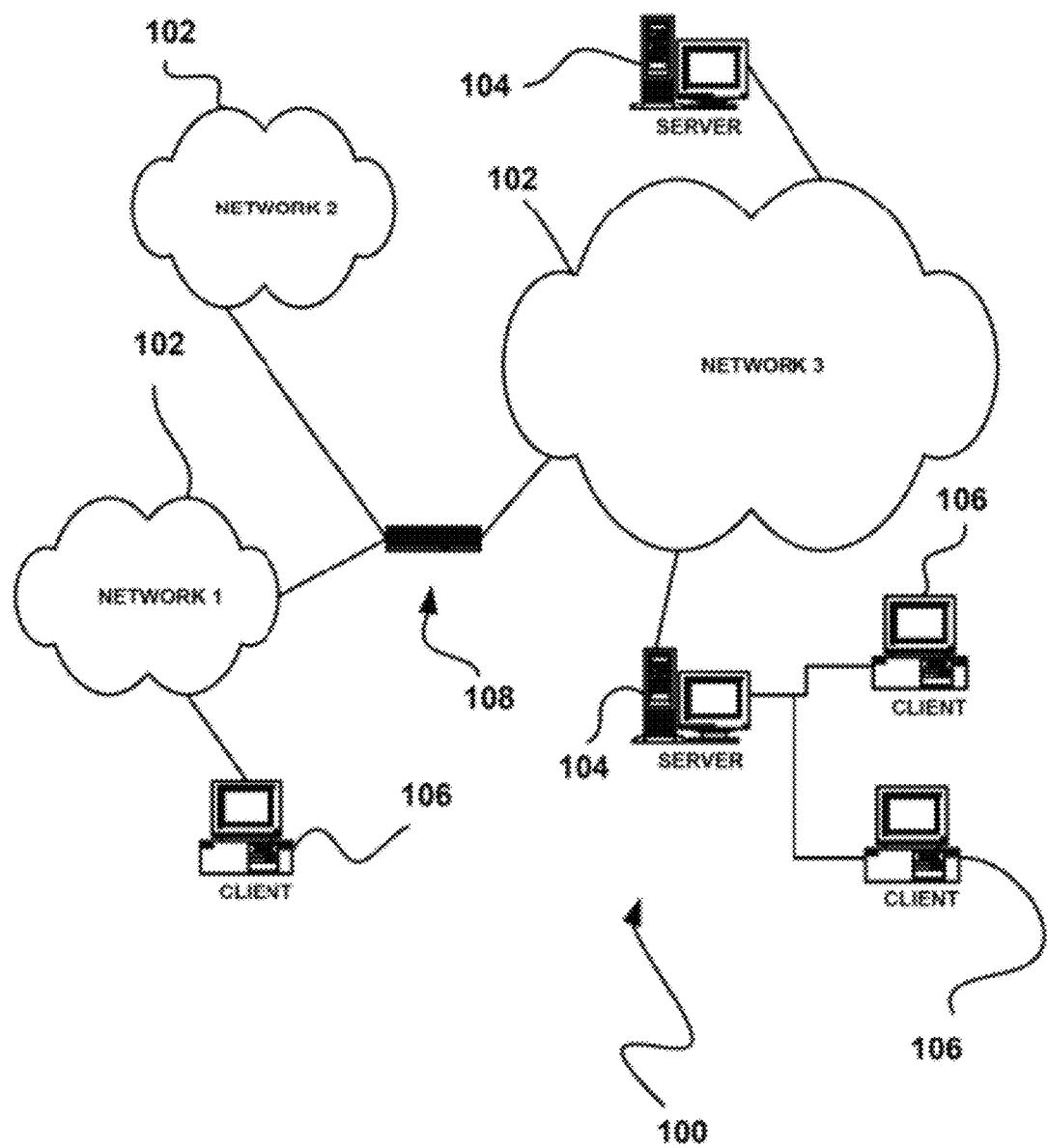
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
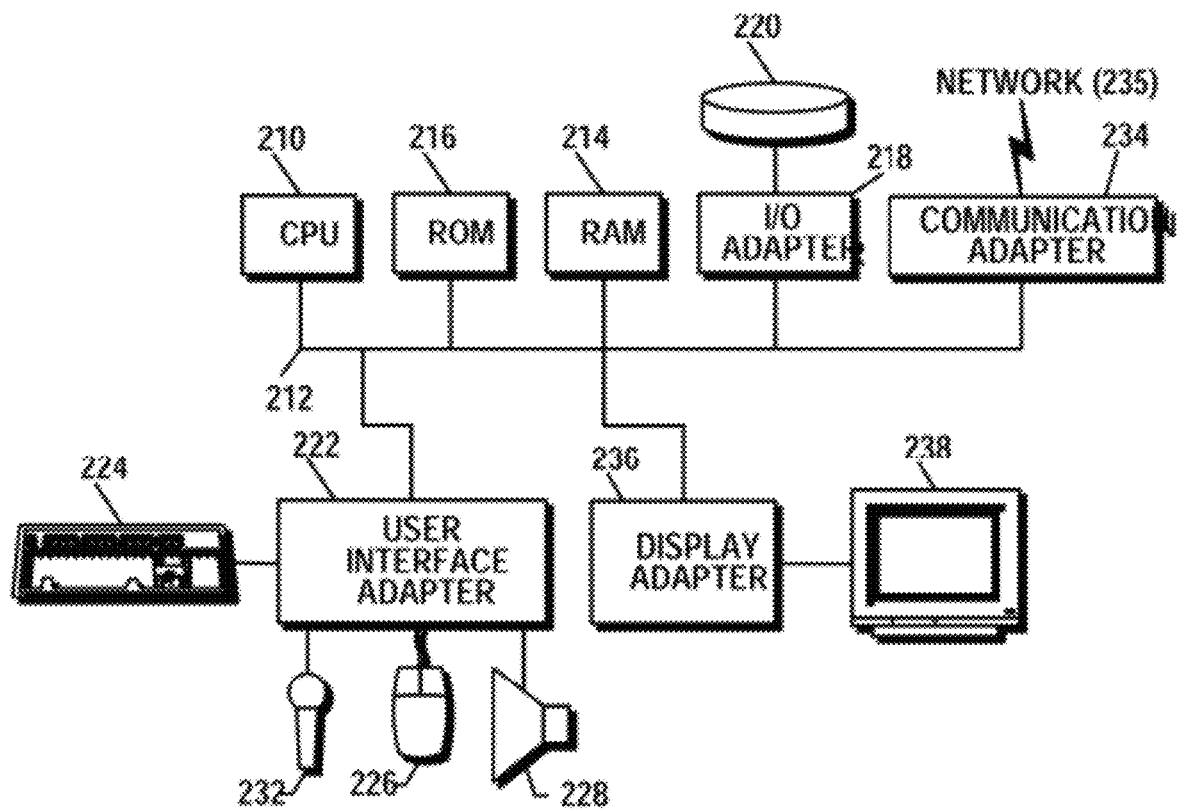
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
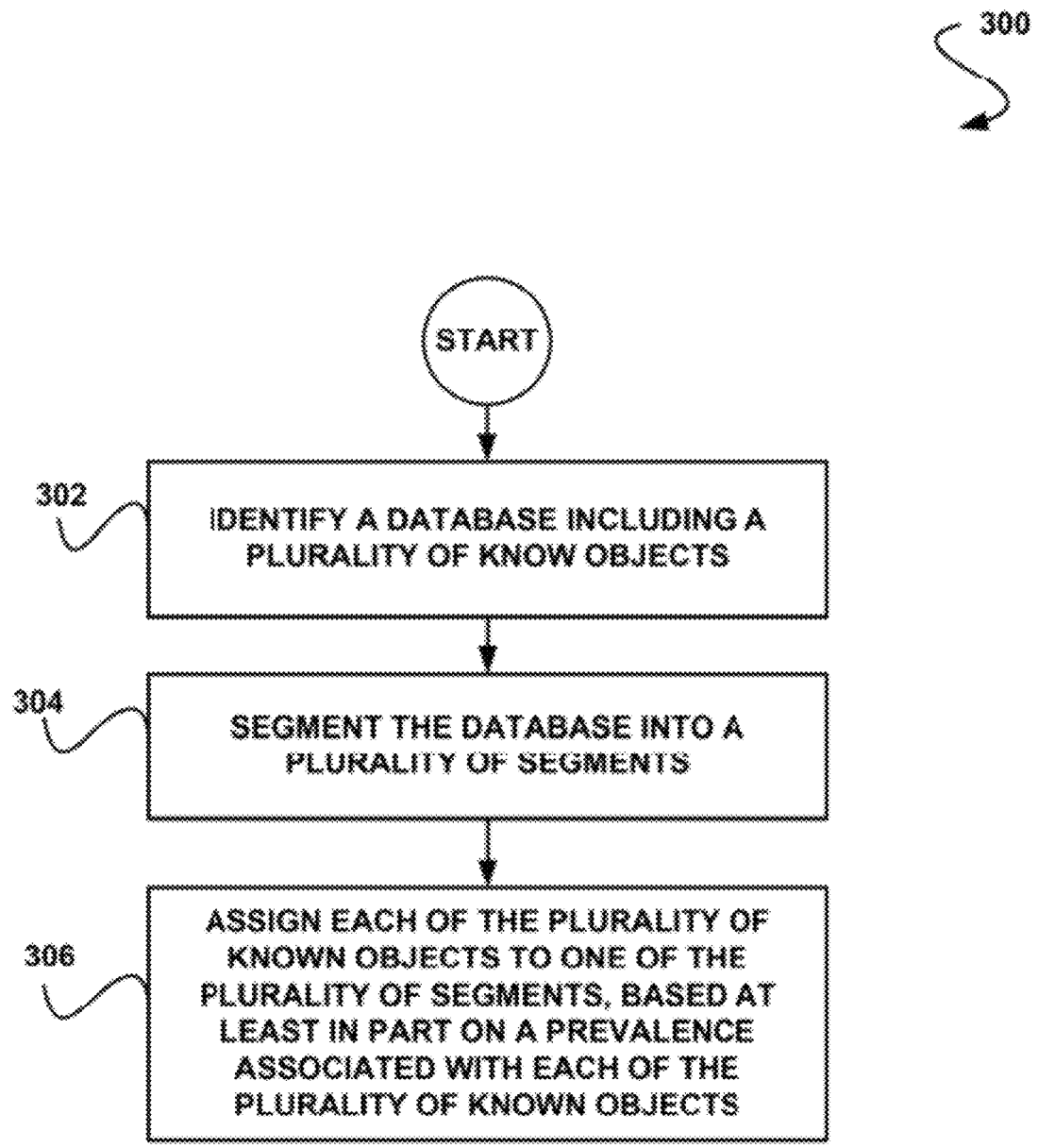
FIG. 3 shows a method for segmenting a database based, at least in part, on a prevalence associated with known objects included in the database, in accordance with one embodiment.

FIG. 3 shows a method 300 for segmenting a database based, at least in part, on a prevalence associated with known objects included in the database, in accordance with one embodiment. As an option, the method 300 may be implemented in the context of the architecture and environment of FIGS. 1 and/or 2. Of course, however, the method 300 may be carried out in any desired environment.

As shown, a database including a plurality of known objects is identified. See operation 302. The objects may include any item capable of being stored in the database. For example, in various embodiments, the known objects may include files or programs.

In either case, the known objects may include objects that are known to be non-malicious. In this case, the database may include a whitelist database. In the context of the present description, a whitelist refers to any data structure that identifies one or more objects that are known to be non-malicious objects.

As another option, the database may include a blacklist database. In the context of the present description, a blacklist refers to any data structure that identifies one or more objects that are known to be malicious, unsafe, or undesirable objects. In this case, the known objects may include objects that are known to be malicious.

In one embodiment, the objects may include whitelisted objects. As an option, the whitelisted objects may be defined utilizing a Bloom filter. In this case, the Bloom filter may be utilized as a whitelist to offset a high false positive rate.

As shown further in FIG. 3, the database is segmented into a plurality of segments. See operation 304. The database may be segmented into any number of segments.

Furthermore, each of the plurality of known objects are assigned to one of the plurality of segments, based at least in part on a prevalence associated with each of the plurality of known objects. See operation 306. The prevalence may be indicative of an amount the object is accessed and/or utilized.

For example, the prevalence may include a high prevalence or a low prevalence. In this case, a high prevalence may indicate that an object is accessed and/or utilized regularly, or more than a predetermined amount. A low prevalence may indicate that an object is not accessed and/or utilized frequently, or less than a predetermined amount. In one embodiment, the prevalence information may be obtained utilizing client system based antivirus software.

The segments may then be allocated such that at least one of the segments corresponds to low prevalence objects. Additionally, at least one of the segments may correspond to high prevalence objects.

In one embodiment, the method 300 may further include determining whether to perform a lookup operation on the database. As an option, a Bloom filter may be utilized to determine whether to perform the lookup operation on the database. In this case, the Bloom filter may be stored on a client system. The Bloom filter may also be associated with and/or represent a blacklist.

Furthermore, a server system may be configured to update the Bloom filter stored on the client system. In this case, the updating may include pushing hashes stored as Bloom filter bit vectors to the client system. As an option, Bloom filter updates may be sent along with additional software updates.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
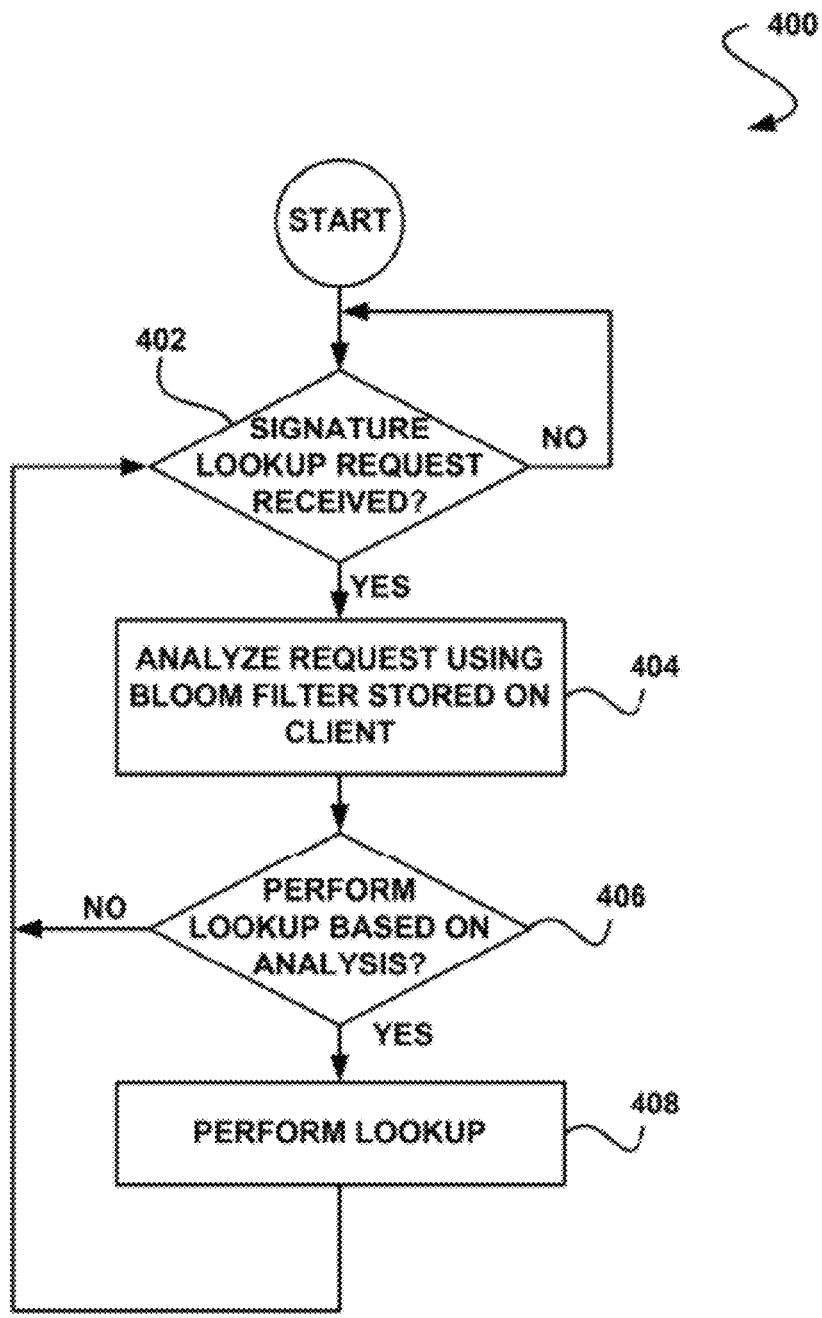
FIG. 4 shows a method for reducing a number of signature lookups required by a system, in accordance with one embodiment.

FIG. 4 shows a method 400 for reducing a number of signature lookups required by a system, in accordance with one embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, a signature lookup request is received. See operation 402. The signature lookup request is then analyzed using a Bloom filter stored on a client device. See operation 404.

It is then determined whether to perform a lookup based on the analysis. See operation 406. If it is determined that a lookup is to be performed, the lookup is performed. See operation 408.

Thus, it may be determined whether to perform a lookup operation on a database utilizing a Bloom filter. In this case, the Bloom filter may be stored on a client system. The client system may include a computer, a PDA, a mobile phone, or any other type of computing device.

Furthermore, a server system may update the Bloom filter stored on the client system. In this case, the updating may include pushing hashes stored as Bloom filter bit vectors to the client system. As an option, Bloom filter updates may be sent along with additional software updates. Furthermore, the Bloom filter may be associated with a blacklist.

Using the method 400, the number of network based lookups in a network may be reduced. For example, in many systems, the number of network based lookups in a cloud is very high. This is because the network based lookups involve signature lookups across a network for each file scanned on a system (e.g. a client system, etc.).

In some cases, however, it may be desirable to keep the lookup rate to less than a certain number of lookups per day. For example, it may be desirable to keep the lookup rate to less than ten lookups per day per client. To accomplish this, harsh criteria is often used to keep the lookup rates low. As a result, many problematic items (e.g. malware, etc.) are not examined and such items are missed on the client systems.

By performing a lookup of file signatures that are available locally on a client machine, better results may be achieved. In some cases, an antivirus DAT (AV DAT) based scanning model may be implemented. In these cases, the high number of specific signatures based on checksum or hash functions (e.g. Cyclic Redundancy Check, Message Digest Algorithm, etc.) in the DAT set may inflate the size of the DATs, making the DAT set computationally and economically infeasible. For example, large memory footprints of DATs may be a challenge on some low memory systems and on systems with slower connectivity to the Internet for downloading these files.

Additionally, the DAT releases may have to be very frequent to achieve the existing performance levels of real time lookups. Thus, there is a need for a relatively smaller DAT size that is sufficient to determine if the MD5 being looked up is present in a blacklist database.

Accordingly, in one embodiment, a set membership data structure may be utilized, such as a Bloom filter, that provides large savings in space, potentially at the expense of false positives. As an option, the MD5 hashes may be stored as a Bloom filter bit vector and pushed very frequently to the client system. Since, in some cases, an MD5 lookup may only determine if the MD5 for a given file is present in the bad file set, this lookup may be accomplished with the local bloom filter.

As the hit needs to be confirmed by a lookup, Bloom filters may be used to determine if a lookup should occur. Where false rates are not an issue, Bloom filters that have a high compression, and therefore a very small size, may be utilized. Additionally, in one embodiment, Bloom filter updates may be streamed between DAT releases to ensure these are near to real time lookups.

Figure 5:
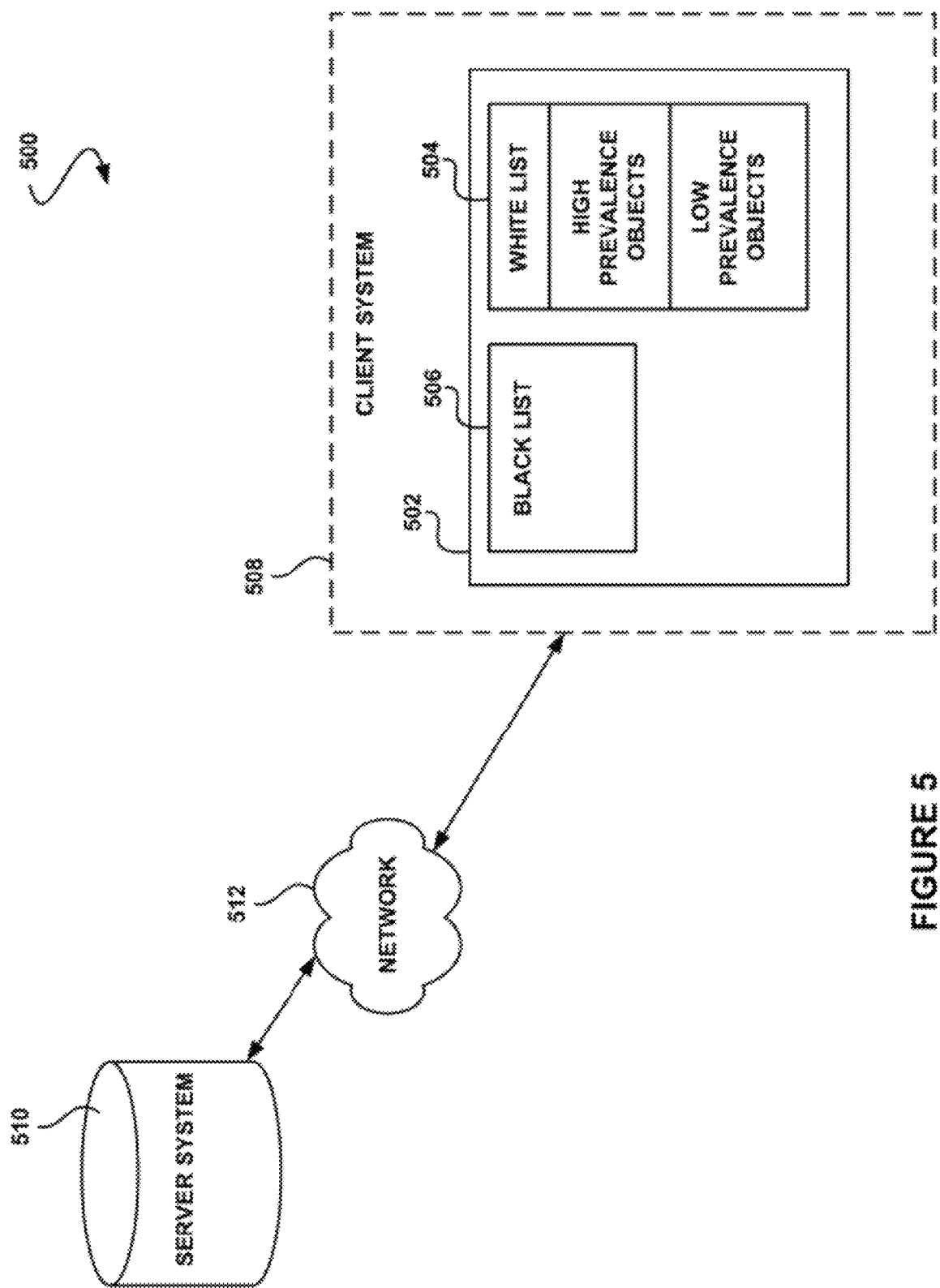
FIG. 5 shows a system for reducing a number of signature lookups required by a system and for segmenting a database based, at least in part, on a prevalence associated with known objects included in the database, in accordance with one embodiment.

FIG. 5 shows a system 500 for reducing a number of signature lookups required by a system and for segmenting a database based, at least in part, on a prevalence associated with known objects included in the database, in accordance with one embodiment. As an option, the system 500 may be implemented in the context of the architecture and environment of FIGS. 1-4. Of course, however, the system 500 may be implemented in the context of any desired environment. Once again, the aforementioned definitions may apply during the present description.

As shown, the system 500 may include memory 502. The memory 502 may be allocated to a database dedicated to a whitelist database 504 and/or a blacklist database 506. The whitelist database 504 and the blacklist database 506 may be located on a client system 508. The client system 508 may be in communication with a server system 510 over a network 512.

As shown, the whitelist database 504 may be segmented into segments that include high prevalence objects and low prevalence objects. This may be implemented to store a large whitelist of programs on a host in a memory efficient way.

For example, in the context of network security, the threat landscape has grown exponentially and continues to grow. The threats have grown so much that almost all the Anti-Virus (AV) vendors are currently evaluating and implementing various technologies to mitigate the unmatched growth in number of threats. Behavioral detection, automated signature creation, heuristic detections, black listing packers, etc. are few of the recent innovations that most of AV vendors implement.

Much of these innovations use the "black listing" approach, where a threat is detected and mitigated if it is known to be of malicious nature. These threats may include a file, a network packet, a particular behavior, etc.

Black listing generally only promises to detect a threat if the threat was analyzed before by the AV provider and has been deemed malign. One issue with this approach is the increasing number of signatures a client side solution needs to carry every time an AV vendor analyzes and deems a file/network packet/behavior as malign. These are typically delivered to the client computers in the form of signature updates.

The exponential growth in the threat landscape has also resulted in an exponential growth in signatures carried by these AV solutions. As another approach, a white listing technique may be implemented to keep a system free from threats. These systems are generally based on the premise that anything not known could be malicious.

This technology is generally more pro-active in mitigating the threats as anything new entering a system is deemed suspicious. This technique again calls for the client systems to carry the most recent updates of a whitelist database. A whitelist database would carry signatures of all the files that are known to be benign. However, with time and advancements in technology, the number of "good" files is also expected to increase. Thus, white listing may also see exponentially increasing updates.

Also, new proactive techniques may have higher than usual false positive rates. To mitigate this, a technique may be implemented to store a large whitelist of programs on a host in a memory efficient way. Therefore, the ability to store a large whitelist on a host allows proactive techniques to be more aggressive against new and potentially unseen malware samples.

In the case of good files, or the files that are benign in nature, a whitelist database may be segmented into several parts, including high prevalence parts and low prevalence parts. In one embodiment, this information may be collected through the client side AV software whenever programs are executed on the system. A first segment may contain signatures for files that are most prevalent (e.g. information on all Microsoft Office files, Adobe files, all system .dlls loaded by these applications, etc.). A second segment may contain signatures for the files that are not prevalent.

By nature of the design of a computing system, the first segment may contain files released as part of operating systems and as part of widely used software applications. In general, this set of files would not change frequently. As an option, these files may be delivered as a bloom filter bit vector, representing the MD5 values of all the white listed tiles to the client systems incrementally at longer intervals of time. In this way, the overhead of delivering large sized signature files may be reduced.

In one embodiment, Bloom filters may be used as a whitelist to offset a high false positive rate an aggressive proactive test may introduce. For example, if a data mining technique is used to detect 90% tpr at 1% fpr, a Bloom filter may be used to make sure that the 90% do not contain known good applications. In this way, as a worst case, the heuristic would be ineffective if the Bloom filter has a false positive.

Furthermore, with respect to the system 500, the blacklist 506 may be represented by a set membership data structure, such as a Bloom filter, that provides large savings in space. The MD5 hashes may be stored as a Bloom filter bit vector and pushed very frequently to the client system 508 by the server system 510 over the network 512. Since, in some cases, an MD5 lookup may only determine if the MD5 for a given file is present in the bad file set, this lookup may be accomplished with the local bloom filter.

In this way, the Bloom filter may be used to determine if a lookup should occur. As an option, Bloom filters that have a high compression and a small size, may be utilized. In one embodiment, Bloom filter updates may be streamed between DAT releases provided by the server system 510.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
   identifying a database including a plurality of known objects;
   segmenting the database into a plurality of segments; and
   assigning each of the plurality of known objects to one of the plurality of segments, based at least in part on a prevalence associated with each of the plurality of known objects, wherein the database includes whitelisted objects, which are non-malicious objects, and which are defined utilizing a Bloom filter of a client system, and wherein the Bloom filter is further configured to determine whether to perform a lookup operation on the database.

2. The computer program product of claim 1, wherein the computer program product is operable such that the known objects include objects known to be non-malicious.

3. The computer program product of claim 1, wherein the computer program product is operable such that the database includes a whitelist database.

4. The computer program product of claim 1, wherein the computer program product is operable such that the prevalence includes one of a high prevalence or a low prevalence.

5. The computer program product of claim 1, wherein the computer program product is operable such that at least one of the plurality of segments corresponds to low prevalence objects.

6. The computer program product of claim 1, wherein the computer program product is operable such that at least one of the plurality of segments corresponds to high prevalence objects.

7. The computer program product of claim 1, wherein the computer program product is operable such that the Bloom filter is utilized as a whitelist to offset a high false positive rate.

8. The computer program product of claim 1, wherein the computer program product is operable such that a server system updates the Bloom filter stored on the client system.

9. The computer program product of claim 8, wherein the computer program product is operable such that the updating includes pushing hashes stored as Bloom filter bit vectors to the client system.

10. The computer program product of claim 8, wherein the computer program product is operable such that Bloom filter updates are sent along with additional software updates.

11. The computer program product of claim 1, wherein the computer program product is operable such that the Bloom filter is associated with a blacklist.

12. The computer program product of claim 1, wherein the computer program product is operable such that the plurality of known objects include at least one of files or programs.

13. The computer program product of claim 1, wherein the computer program product is operable such that prevalence information is obtained utilizing client system based antivirus software.

14. A method to be performed in conjunction with a processor, comprising:

identifying a database including a plurality of known objects;

segmenting the database into a plurality of segments; and assigning each of the plurality of known objects to one of the plurality of segments, based at least in part on a prevalence associated with each of the plurality of known objects, wherein the database includes whitelisted objects, which are non-malicious objects, and which are defined utilizing a Bloom filter of a client system, and wherein the Bloom filter is further configured to determine whether to perform a lookup operation on the database.

15. An apparatus, comprising:

a processor; and a memory coupled to the processor, wherein the apparatus is configured for:

identifying a database including a plurality of known objects:

segmenting the database into a plurality of segments; and assigning each of the plurality of known objects to one of the plurality of segments, based at least in part on a prevalence associated with each of the plurality of known objects, wherein the database includes whitelisted objects, which are non-malicious objects, and which are defined utilizing a Bloom filter of a client system, and wherein the Bloom filter is further configured to determine whether to perform a lookup operation on the database.

\* \* \* \* \*